(12) United States Patent
Craik et al.

(10) Patent No.: US 8,510,546 B2
(45) Date of Patent: Aug. 13, 2013

(54) RUN-AHEAD APPROXIMATED COMPUTATIONS

(75) Inventors: Christopher J. Craik, Austin, TX (US);
H. Peter Hofstee, Austin, TX (US);
Damir A. Jamsek, Austin, TX (US);
Jian Li, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 13/074,438

(22) Filed: Mar. 29, 2011

(65) Prior Publication Data

US 2012/0254603 A1  Oct. 4, 2012

(51) Int. Cl.
G06F 1/24 (2006.01)
G06F 9/00 (2006.01)

(52) U.S. Cl.
USPC .......................................... 713/100

(58) Field of Classification Search
None
See application file for complete search history.

(56) References Cited

U.S. PATENT DOCUMENTS

| | | | |
|---|---|---|---|
| 5,627,944 A | 5/1997 | Fujimoto et al. | |
| 5,684,929 A * | 11/1997 | Cortes et al. | 706/25 |
| 5,996,013 A | 11/1999 | Delp et al. | |
| 7,487,054 B2 * | 2/2009 | Ayala et al. | 702/81 |
| 7,606,804 B2 | 10/2009 | McDonald | |
| 2005/0180506 A1 * | 8/2005 | Wittebrood et al. | 375/240.16 |
| 2007/0294157 A1 | 12/2007 | Singla et al. | |
| 2009/0172359 A1 * | 7/2009 | Shen et al. | 712/215 |
| 2009/0319755 A1 * | 12/2009 | Montvelishsky | 712/17 |
| 2010/0138637 A1 | 6/2010 | Inada | |
| 2011/0055420 A1 * | 3/2011 | Zuckerman et al. | 709/231 |
| 2011/0111843 A1 * | 5/2011 | Nicely et al. | 463/27 |
| 2011/0302463 A1 * | 12/2011 | Kallman | 714/699 |

FOREIGN PATENT DOCUMENTS

WO  WO 2009/141654 A1  11/2009

OTHER PUBLICATIONS

Patents Act 1977: Search Report under Section 17(5) dated Jun. 29, 2012 for Application No. GB1204629.8, 4 pages.
USPTO U.S. Appl. No. 13/468,064.
Boutsidis, Christos et al, "Random projections for the nonnegative least-squares problem", Linear Algebra and its Applications 431 (2009), pp. 760-771.
Martinez, Jose F. et al., "Speculative Synchronization: Programmability and Performance for Parallel Codes", IEEE MICRO, Nov.-Dec. 2003, pp. 126-134.
Mutlu, Onur, "Efficient Runahead Execution Processors", Ph.D. Dissertation, University of Texas at Austin, Aug. 2006, 267 pages.
Ouyang, Jessica et al., "Epoch parallelism: one execution is not enough", Research Vision Session, OSDI'2010, pp. 1-2.

* cited by examiner

*Primary Examiner* — Thomas Lee
*Assistant Examiner* — Zhipeng Wang
(74) *Attorney, Agent, or Firm* — Stephen J. Walder, Jr.; Eustus D. Nelson (57) ABSTRACT

Mechanisms are provided for performing approximate run-ahead computations. A first group of compute engines is selected to execute full computations on a full set of input data. A second group of compute engines is selected to execute computations on a sampled subset of the input data. A third group of compute engines is selected to compute a difference in computation results between first computation results generated by the first group of compute engines and second computation results generated by the second group of compute engines. The second group of compute engines is reconfigured based on the difference generated by the third group of compute engines.

13 Claims, 4 Drawing Sheets

RUN-AHEAD APPROXIMATED COMPUTATIONS

BACKGROUND

The present application relates generally to an improved data processing apparatus and method and more specifically to mechanisms for providing run-ahead approximated computations.

A parallel computing system is a computing system with more than one processor for parallel processing of tasks. A parallel program is a program that may consist of one or more jobs that may be separated into tasks that may be executed in parallel by a plurality of processors. Parallel programs allow the tasks to be simultaneously executed on multiple processors, with some coordination between the processors, in order to obtain results faster.

There are many different approaches to providing parallel computing systems. Examples of some types of parallel computing systems include multiprocessing systems, computer cluster systems, parallel supercomputer systems, distributed computing systems, grid computing systems, and the like. These parallel computing systems are typically distinguished from one another by the type of interconnection between the processors and memory. One of the most accepted taxonomies of parallel computing systems classifies parallel computing systems according to whether all of the processors execute the same instructions, i.e. single instruction/multiple data (SIMD), or each processor executes different instructions, i.e. multiple instruction/multiple data (MIMD).

Another way by which parallel computing systems are classified is based on their memory architectures. Shared memory parallel computing systems have multiple processors accessing all available memory as a global address space. These shared memory parallel computing systems may be further classified into uniform memory access (UMA) systems, in which access times to all parts of memory are equal, or non-uniform memory access (NUMA) systems, in which access times to all parts of memory are not equal. Yet another classification, distributed memory parallel computing systems, also provides a parallel computing system in which multiple processors are utilized, but each of the processors can only access its own local memory, i.e. no global memory address space exists across them. Still another type of parallel computing system, and the most prevalent in use today, is a combination of the above systems in which nodes of the system have some amount of shared memory for a small number of processors, but many of these nodes are connected together in a distributed memory parallel system.

In some parallel computing systems, the Message Passing Interface is used as a way of communicating and coordinating work performed by a plurality of computing or processing devices in parallel. The Message Passing Interface (MPI) is a language-independent computer communications descriptive application programming interface (API) for message passing on shared memory or distributed memory parallel computing systems. With MPI, typically a parallel application is provided as one or more jobs which are then separated into tasks which can be processed in a parallel manner on a plurality of processors of one or more computing devices. MPI provides a communication API for the processors to communicate with one another regarding the processing of these tasks.

The use of parallel computing systems to process large analytical workloads, e.g., facial recognition workloads, weather or traffic condition analysis, biological sequence analysis, Internet traffic analysis, document warehouse analytics, various data mining applications, or any other type of large analytical workload, is becoming increasingly important in today's information age. As can be appreciated, the amount of data upon which such analytics are performed is quite vast and continues to increase. Even with the speed increases made possible through parallel computing systems, the sheer size of the data that needs to be analyzed, at target cost-performance levels, makes the application of analytics to the full set of data rather impractical.

SUMMARY

In one illustrative embodiment, a method, in a data processing system, is provided for performing approximate run-ahead computations. The method comprises selecting a first group of compute engines, from a pool of compute engines, to execute full computations on a full set of input data. The method further comprises selecting a second group of compute engines, from the pool of compute engines, to execute computations on a sampled subset of the input data. The method also comprises selecting a third group of compute engines, from the pool of compute engines, to compute a difference in computation results between first computation results generated by the first group of compute engines and second computation results generated by the second group of compute engines. Moreover, the method comprises reconfiguring the second group of compute engines based on the difference generated by the third group of compute engines.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for providing run-ahead approximated computations. The mechanisms of the illustrative embodiments coordinate both fast (always run-ahead) approximated computations performed by a first set of data processing devices with conventional analytic computations on a full set of data performed by a second set of data processing devices. The mechanisms of the illustrative embodiments perform such coordination by leveraging accuracy, confidence, and speed between the two sets of data processing devices so that the combined results from both are acceptable for analytics.

With the mechanisms of the illustrative embodiments, a relatively large group (I) of compute engines, e.g., data processing devices, processors within one or more data processing devices, or the like, are employed to handle a conventional computation with full input data. A second, relatively small, group (J) of compute engines are used to perform computations on sampled data with run-ahead computation. That is, in one example implementation, analytical workloads may perform the same computations on a large amount of data, such as by using loops having large iteration sets. The first group (I) progresses through the iterations of the loop in a normal manner starting at an initial iteration value and performing computations on each iteration (according to the step value of the loop). The second group (J) samples the iterations and executes the computations in a run-ahead manner, i.e. performing computations of iterations of the loop ahead of the time that they would normally be performed if the loop were to be executed in a sequential manner with regard to the iterations of the loop and the step value for the loop.

An additional relatively small group (K) of compute engines are used to check and record differences between the results of the computations generated between the groups (I) and (J) when the computations of the first group (I) catches up to the starting iteration of the workload handled by the second group (J). Based on these differences, or deltas, an analytics coordinator engine may perform various operations for scheduling and reconfiguring the first and second groups of compute engines (I) and (J).

For example, based on the differences between the results obtained by the first group (I) and the second group (J), the analytics coordinator may reconfigure the number of compute engines in the second group (J), and the number of samples of the full set of data processed by the increased number of compute engines in the second group (J), so as to reduce the difference (delta) between the results obtained by the first group (I) and the second group (J) such that the difference is within a pre-determined tolerance. The reduced difference (delta) between the results is achieved by allowing more processors in J to work on increased number of data samples within the same compute time. In this way, the accuracy of the approximation generated by the second group (J), i.e. the runahead compute engines, is kept to within an acceptable tolerance such that the results of the runahead compute engines can be utilized to approximate the computation for a set of iterations of the overall analytics of the large set of data. These approximate computations are combined with the analytical computations performed by the first group of compute engines (J) to provide approximate computations for analytics for a large set of input data.

In addition, if a next phase of the analytical computations exists, i.e. a subsequent phase that utilizes the results from the current phase, then if the difference between the calculations performed by the second group (J) and the first group (I) are within the pre-determined tolerance, then the results of the current phase of analytical computations made by the second group (J) can be fed into the next phase of computations for use by the algorithm while the computations by the first group (I) are still on-going, i.e. before the computations by the first group (I) are complete. In this way, the speed of computation is increased by providing a mechanism for runahead execution of phases of computation.

As a further example, the analytics coordinator engine, if it determines that the difference between the results of the computation of the first and second groups (I) and (J) is larger than the pre-determined tolerance, then a partial re-computation may be performed in a next phase of execution. This essentially rolls-back the computations performed by the second group (J) of compute engines. The partial re-computation is performed with an increased number of compute engines in the second group (J) and with an increased amount of data, e.g., a larger number of samples from the input data.

In yet another example, the analytics coordinator engine may determine that the confidence level of the accuracy of the computations performed by the second group (J) of compute engines is higher than a predetermined threshold. If so, then the analytics coordinator engine may instruct or otherwise cause the first group (I) of compute engines to skip part of their computations, e.g., the remaining iterations over which the first group (I) is to perform computations. That is, since the approximation of the computation is sufficiently accurate as generated by the second group (J), then there is no need to continue to compute on every iteration as is done by the first group (I) of compute engines.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
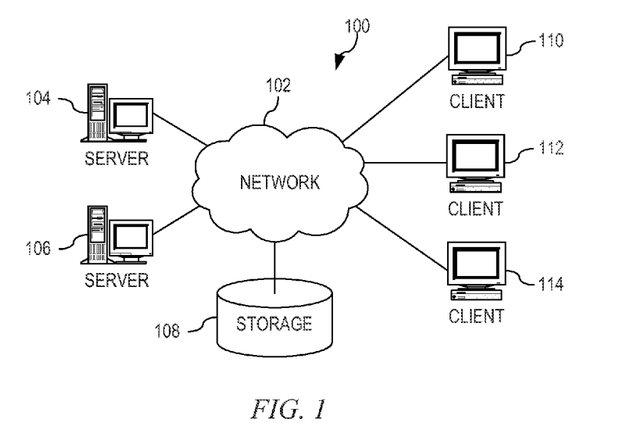
FIG. 1 is an example diagram of a distributed data processing system in which aspects of the illustrative embodiments may be implemented.
Figure 2:
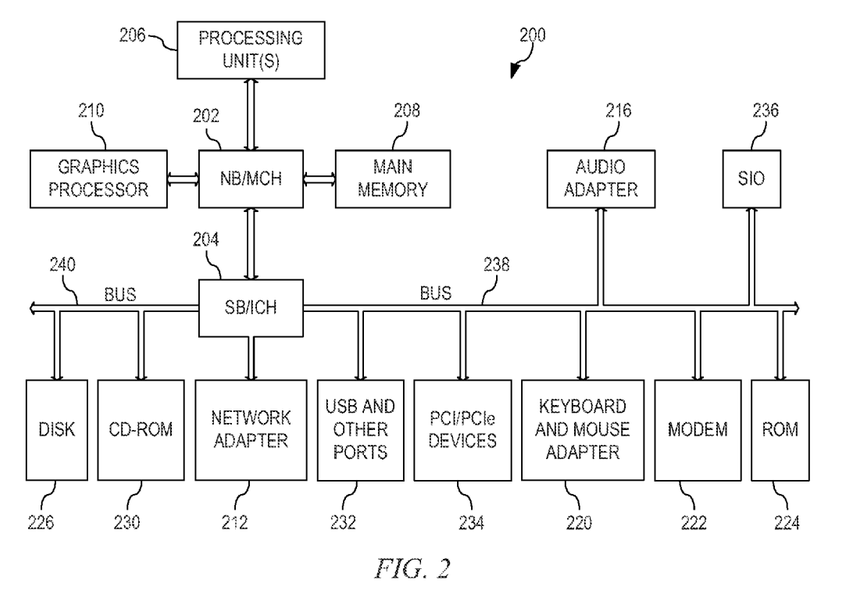
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the illustrative embodiments provide mechanisms for run-ahead approximated computations using a parallel computing system. The parallel computing system may be any known or later developed parallel computing system, such as a single-instruction-multiple-data (SIMD), multiple-instruction-multiple-data (MIMD), a uniform memory access (UMA) system, a non-uniform memory access (NUMA) system, a Message Passing Interface (MPI) system, or the like. As such, the parallel computing system includes a plurality of data processing devices, processors, or the like. For example, taking FIG. 1 as an example, one or more processors may be provided in one or more of the servers 104 and 106, the clients 110-114, or the like. The parallel computing system may be comprised of all of these processors or a subset of these processors. In one illustrative embodiment, the parallel computing system is comprised of a plurality of processors provided in a single data processing system, e.g., any one of the server 104, 106 or clients 110-114. In other illustrative embodiments, the parallel computing system is comprised of a plurality of processors provided in a plurality of data processing systems, e.g., both servers 104 and 106, a combination of processors from a plurality of clients 110-114, or a combination of processors from one or more of servers 104 and 106 and one or more of clients 110-114.

The parallel computing system, in accordance with the mechanisms of the illustrative embodiments, includes an analytics coordinator engine that coordinates the operation of groups of compute engines. Moreover, the analytics coordinator engine operates to modify the composition and operation of these groups of compute engines based on an analysis of the results of the computations of these groups of compute engines.

Figure 3:
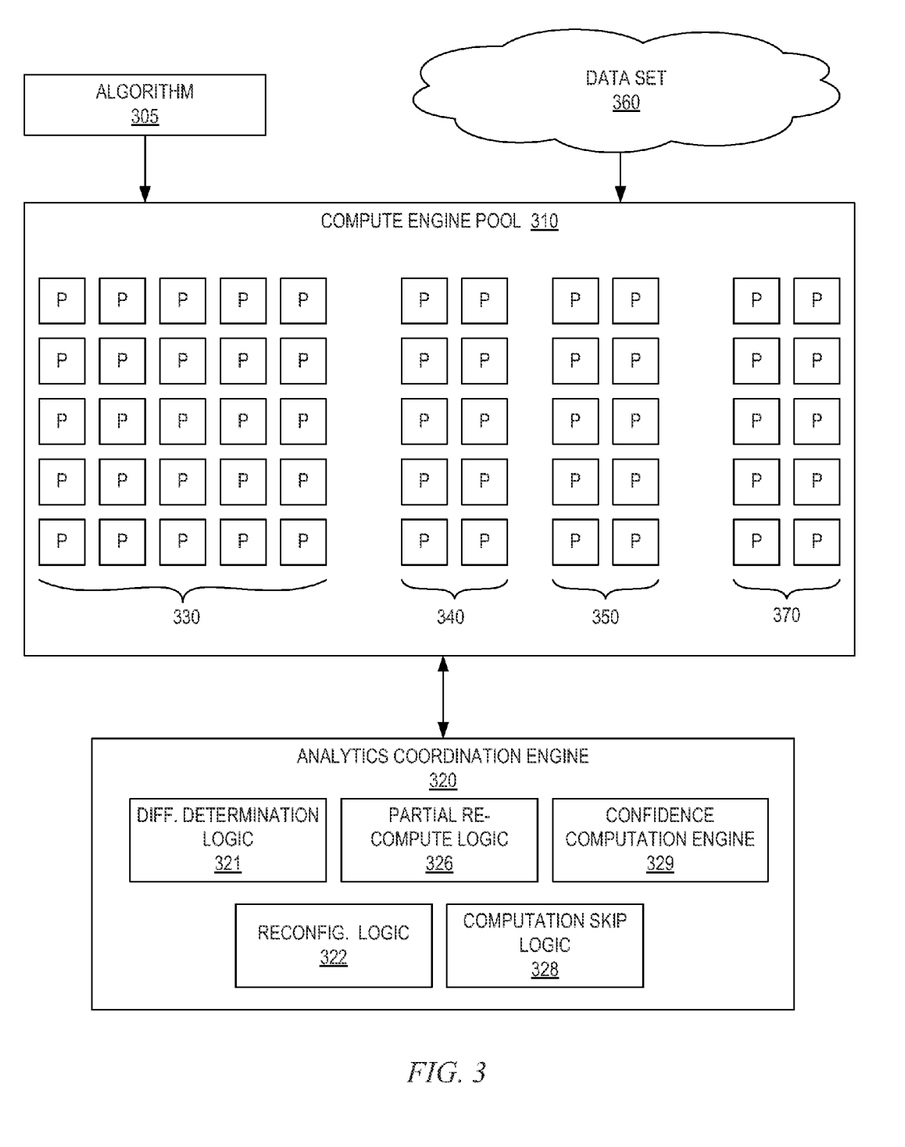
FIG. 3 is an example diagram of a parallel computing system implementing groupings of compute engines and an analytics coordinator engine in accordance with one illustrative embodiment.

FIG. 3 is an example diagram of a parallel computing system implementing groupings of compute engines and an analytics coordinator engine in accordance with one illustrative embodiment. For ease of explanation, it will be assumed that the parallel computing system 300 in FIG. 3 implements a single-instruction-multiple-data (SIMD) operation where a same instruction or set of instructions is executed by each compute engine on a different data element or set of data elements. It should be appreciated that while such a SIMD operation will be assumed for purposes of the examples provided herein, the illustrative embodiments are not limited to such. To the contrary, a multiple-instruction-multiple-data (MIMD) operation may be implemented by the parallel computing system 300, or other parallel processing operations may be used without departing from the spirit and scope of the illustrative embodiments.

As shown in FIG. 3, the parallel computing system 300 comprises a pool of compute engines 310, which in the depicted example is a pool of processors on one or more data processing systems. Rather than a pool of processors, the compute engines may instead comprise larger data processing devices comprising one or more processors, or the like. Furthermore, the compute engines can be a pool of functional units that consist of compute logics, which can be part of a conventional processor, a graphic processor, or other type of data processing device. The compute engines can also be a pool of special purpose accelerators to speed up certain types of computations, e.g., SIMD units, compression/decompression accelerators, RegEx (regular expression) accelerators, graphic processors, DSP (Digital Signal Processing) processors, FPGA (Field Programmable Gate Arrays), etc. In general, a compute engine can be any logic that handles data computation rather than data storage or communication. The pool is actually a logical pool of compute engines in that the compute engines themselves may be distributed across a plurality of data processing systems located local or remote to each other and even may be accessible through one or more data networks, such as a LAN, WAN, the Internet, or the like. Groups 330-350 of compute engines may be generated from the pool of compute engines 310 in order to facilitate computation approximations using run-ahead computations in accordance with the illustrative embodiments.

Certain ones of the groups 330-340 may be employed to perform computations of an algorithm 305 on a large set of data 360 in a parallel manner. In the depicted example, a first group 330 of compute engines corresponds to a relatively large set of compute engines, which can be on the order of hundreds of thousands, configured for performing full analytic computations on each data element in the large set of data 360. The second group 340 of compute engines corresponds to a relatively smaller set of compute engines, which can be two or more orders of magnitude smaller, configured for performing approximate computations of the algorithm 305 on a relatively smaller subset of the large set of data 360, such as sampled data from the large set of data 360. For example, the second group 340 of the compute engine may be configured to process 1 data element for every 9000 data elements in the large set of data 360 whereas the first group 330 of compute engines may be configured to process every data element of the large set of data 360. While the first group 330 may be configured such that it would process every data element of the large set of data 360, in accordance with the illustrative embodiments, the first group 330 may not actually process every data element, but a subset of the data elements corresponding to a portion of the large set of data elements 360 provided to the first group 330 for processing while other portions of the large set of data 360 are approximated by the operation of the second group 340 of compute engines.

The parallel computing system 300 further comprises an analytics coordinator engine 320 having difference comparison logic 321, reconfiguration logic 322, phase run-ahead logic 324, partial re-computation logic 326, computation skipping logic 328, and confidence computation engine 329. The operations of these various logic elements 321-329 will be described in greater detail hereafter. These logic elements 321-329 may be implemented in software, hardware, or any combination of software and hardware. In one illustrative embodiment, the analytics coordinator engine 320 may comprise one or more processors, memory, and the like, with the logic elements 321-329 being implemented by software instructions executed on the one or more processors employing the memory. In other illustrative embodiments, the logic 321-329 may be hard-wired into the circuitry of the analytics coordinator engine 320 as circuit elements configured to perform the operations described hereafter.

In operation, the analytics coordinator engine 320 is responsible for establishing the groupings 330-350 of compute engines within the pool of compute engines 310. A first set of compute engines from the pool 310 are selected for inclusion in a relatively large group 330 of compute engines used to perform full analytical computations on the data set 360. The manner by which the compute engines are selected may take many different forms including an arbitrary selection, a selection based on performance capabilities of the compute engines, current workloads of the compute engines, physical affinity, or any other criteria that may be used for selection of compute engines as will be readily apparent to those of ordinary skill in the art in view of the present description.

In addition, the analytics coordinator engine 320 selects a second set of compute engines from the pool 310 for inclusion in the second group 340 that is responsible for run-ahead approximate computations on a subset of the data set 360. The second group 340 is relatively smaller than the first group 330. Moreover, the analytics coordinator engine 320 selects a set of compute engines for inclusion in the third group 350 that is responsible for comparing the results of computations performed by the first group 330 and results of computations performed by the second group 340 to determine a difference in the results being obtained. The difference is used by the analytics coordinator engine 320 to determine how to dynamically modify the composition and operation of the groups 330-340 of compute engines to obtain sufficiently accurate approximate computation on the data set 360 in as efficient a manner as possible. That is, the analytics coordinator engine 320 coordinates the operation of the groups 330-340 of compute engines based on the degree of accuracy of the approximate computations and a measure of confidence in these approximate computations.

As mentioned above the second group 340 of compute engines operate on a subset of the data set 360, such as sampled data elements from the data set 360, and executes in a run-ahead operation. As a result, the second group 340 of compute engines will typically be executing their instructions and performing their computations on data elements that are much later in the data set 360 than data elements being processed by the first group 330 of compute engines. For example, the first group 330 of compute engines may be performing computations on data elements 1-100 while the second group 340 may perform computations on sampled data up to data element 1000 or more at the same time that the first group 330 is operating on data elements 1-100. In many machine learning algorithms, computation on reduced input set may yield good enough results compared to full input. The reason is that machine learning algorithms typically yield local optimal rather than global optimal results. Using the Non-negative Matrix Factorization (NMF) algorithm as an example, a randomly selected matrix subset for approximate computation can be used to generate a list of hot keys, which may overlap to a large extent with the results from the original matrix input. If it is acceptable that only a certain amount of hot keys need be correctly identified by approximate computation, then using a subset of compute engines (e.g., the second group 340) to work on a subset of data achieves the same performance at much higher speed and lower cost.

The third group 350 of compute engines compare the results of computations generated by the first group 330 of compute engines and the results of computations generated by the second group 340 of compute engines. For example, the results of computations on data element 1 in the data set 360 as processed by the first group 330 of the compute engines are compared to the results of computations on data element 500 in the data set 360 as processed by the second group 340 as one of the sampled data elements from the data set 360. The difference between the results may be provided to the analytics coordinator engine 320 which may compare the difference to one or more pre-determined thresholds to determine if the results being generated by the second group 340, i.e. the approximate calculations run-ahead group, are sufficiently accurate with a sufficient amount of confidence. Confidence estimation is a generic machine learning rescoring approach for estimating the probability of correctness of the outputs. A simple confidence estimation method can be implemented by monitoring the fraction of correct results among all results from prior iterations of the computation. Such fraction can be used as the estimation of the confidence. One can also use an analytical model to calculate the confidence offline based on the characterization of the application. The output of the confidence estimation is used to compare to the pre-determined thresholds.

The analytics coordinator engine 320 may receive the results of the comparisons generated by the third group 350 and perform various operations for reconfiguring the groups 330-350 of compute engines and modifying their operation so as to achieve a desired level of accuracy and confidence in the overall computation results obtained from the combination of groups 330-340. The goal of the analytics coordinator engine 320 is to coordinate the operation of the group 330 with the group 340 so that the approximation computations performed by the group 340 are within a pre-determined tolerance of the full computations performed by the group 330 and thus, the results of the group 340 may be relied upon as sufficiently accurate approximations. In this way, the speed at which the group 340 may perform its approximate computations may be leveraged to provide a faster overall approximate computation that is useable with the algorithm 305.

The analytics coordinator engine 320, using difference comparison logic 321, compares the differences, or deltas, generated by the third group 350 of compute engines to one or more pre-determined threshold values to determine if the results of the approximate computations performed by the second group 340 are sufficiently accurate to the full computations being performed by the first group 330 of compute engines. For example, the pre-determined threshold values may include a value of 10% thereby specifying that the difference between the approximate computations performed by the second group 340 can differ from the computations being performed by the first group 330 by at most 10% and be considered sufficiently accurate.

If the approximate computation results of the second group 340 of compute engines is not sufficiently accurate as determined by a comparison of the differences with one or more pre-determined thresholds by difference comparison logic 321, then the composition and operation of the second group 340 of compute engines may be modified by reconfiguration logic 322 and the analytical computations that were being performed by the second group 340 of compute engines may be at least partially re-computed under the control of partial re-compute logic 326.

For example, if the first group 330 of compute engines are referred to herein as group (I), the second group 340 of compute engines are referred to herein as group (J), and the third group 350 of compute engines are referred to herein as group (K), then group (K) generates difference measures between the computation results of groups (I) and (J). If the difference measures, e.g., |(I)−(J)|, result in a difference that is greater than or equal to a predetermined threshold delta, i.e. |(I)−(J)|≧delta, as determined by the difference comparison logic 321, then one or more of reconfiguration logic 322 or partial re-compute logic 326 are initiated to perform a reconfiguration and re-compute operation.

For example, based on the differences between the results obtained by the first group (I) 330 and the second group (J) 340, the reconfiguration logic 322 of the analytics coordinator engine 320 may reconfigure the number of compute engines in the second group (J) 340, and the number of samples of the full set of data 360 processed by the increased number of compute engines in the second group (J) 340, so as to reduce the difference between the results obtained by the first group (I) 330 and the second group (J) 340 such that the difference is within a pre-determined tolerance delta. That is, the reconfiguration logic 322 may allocate additional compute engines from a remaining portion 370 of compute engines in the compute engine pool 310 that have not been allocated to other groups 330-350. Given that the number of compute engines in the second group (J) 340 is significantly smaller than that in the first group (I) 330, one can also reallocate some compute engines from the first group (I) 330 to the second group (J) 340 without noticeable impact on the computing speed and accuracy of the first group (I) 330. Other ways to allocate and reallocate the compute engines apply as long as the computing speed and accuracy of the first group (I) 330 are acceptable based on certain predetermined metrics. This in effect increases the number of compute engines in the second group 340 allowing them to operate on a larger number of sampled data elements from the data set 360. As a result, a more accurate approximate computation may be generated that will tend to be closer to the full computation being performed by the first group 330 of compute engines. The new execution speed of the second group 340 varies with the changes in the number of compute engines as well as the mount of data input. The reconfiguration logic 322 makes sure the second group 340 will still execute their computations faster than the first group 330 and still do so in a run-ahead manner due to the sampling of data elements.

In this way, the accuracy of the approximation generated by the second group (J) 340, i.e. the run-ahead compute engines, is kept to within an acceptable tolerance such that the results of the run-ahead compute engines 340 can be utilized to approximate the computation for a set of iterations of the overall analytics of the large set of data 360. These approximate computations are combined with the analytical computations performed by the first group of compute engines (J)

330 to provide approximate computations for analytics for the large set of input data 360.

As a further example, the analytics coordinator engine 320, if it determines that the difference between the results of the computation of the first and second groups (I) 330 and (J) 340 is larger than the pre-determined tolerance, then the partial re-compute logic 326 may be employed to initiate a partial re-computation in a next phase of execution. This essentially rolls-back the computations performed by the second group (J) 340 of compute engines. The partial re-computation is performed with an increased number of compute engines in the second group (J) 340, such as by allocating additional processors from the unallocated processors 370 in the compute engine pool 310 for example, and with an increased amount of data, e.g., a larger number of samples from the input data.

In addition, if a next phase of the analytical computations exists, i.e. a subsequent phase in which another portion of the algorithm 305 is being executed by the compute engines in groups 330-340, which utilizes the results from the current phase, then if the difference between the calculations performed by the second group (J) 340 and the first group (I) 330 are within the pre-determined tolerance delta, then an interrupt is triggered by the analytics coordination engines 320 to stop the computation of the first group (I) 330 and initialize it for the next phase. Then, the results of the current phase of analytical computations made by the second group (J) 340 can be fed into the first group (I) 330 for the next phase of computations for use by the algorithm 305. In this way, the speed of computation is increased by providing a mechanism for run-ahead execution of phases of computation.

For each of the differences received by the analytics coordinator engine 320 from the third group 350 of compute engines, the analytics coordinator engine 320 may compute a confidence measure to determine how reliable the difference calculation is. This confidence measure may be used by the analytics coordinator engine 320 to determine if the confidence level of the accuracy of the computations performed by the second group (J) 340 of compute engines is equal to or higher than a predetermined threshold based on a confidence in the difference measurements. If the confidence level is equal to or higher than a predetermined threshold, then the analytics coordinator engine 320 may instruct or otherwise cause the first group (I) of compute engines to skip part of their computations, e.g., the remaining iterations over which the first group (I) 330 is to perform computations. That is, since the approximation of the computation is sufficiently accurate as generated by the second group (J) 340, then there is no need to continue to compute on every iteration as is done by the first group (I) 330 of compute engines. Thus, the computation skip logic 328 may be employed to instruction the compute engines in the first group (I) 330 to discontinue the computations of the current phase of execution, either combine their results with the approximate results generated by the second group (J) 340 or otherwise discard the results of the first group (I) 330, and then proceed to the next phase of computation, if one exists.

Using the mechanisms of the illustrative embodiments as described herein, a highly parallel and efficient run-ahead mechanism is provided that can provide accurate approximations of computation results. While these computations are "approximations" the reality is that these approximations generally have a high accuracy with regard to fully analytical computations. For example, it has been found through experimentation that, for a nonnegative matrix factorization (NMF) algorithm (a key kernel in data mining analytics workloads), by allowing as much as a 10% error in approximation, the speed of the analytic calculations performed by the mechanisms of the illustrative embodiments may be increase by 400%. For example, if a full analytical calculation would operate on 800 rows of data, reducing the number of rows to only 450 rows of data through sampling and the use of the illustrative embodiments will provide approximately a 10% error in the computation but would provide a 400% faster computation.

As mentioned above, the illustrative embodiments may be utilized with many different types of analytical computations and parallel computing systems. Analytical computations may be generally categorized into descriptive analytics, predictive analytics, and prescriptive analytics. Descriptive analytics involve computations having to do with standard reporting (concerned with describing what happened), ad hoc reporting (concerned with describing how many, how often, or where things occur), and query/drill down operations (concerned with describing what exactly the problem was). Predictive analytics are involve computations having to do with alerts (identifying what actions are needed), simulations (predicting what could happen), forecasting (predicting what might happen if trends continue), and predictive modeling (predicting what would happen in response to particular conditions). Prescriptive analytics involve computations regarding optimization (how can one obtain the best outcome) and stochastic optimization (how can one achieve the best outcome including the effects of variability). The illustrative embodiments may be utilized with compute engines operating on workloads having to do with any of these types of analytical computations or any other type of analytical computation not specifically described herein.

Figure 4A:
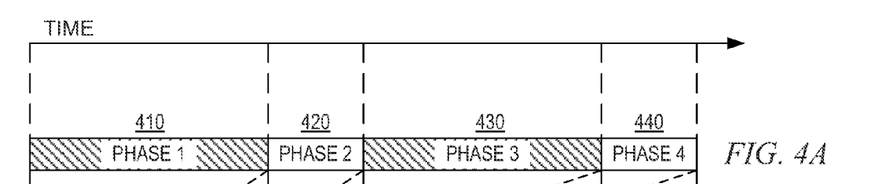
FIGS. 4A-4D are example diagrams illustrating phases of computation under various conditions in accordance with one illustrative embodiment.

To further illustrate the operation of the illustrative embodiments, reference is now made to FIGS. 4A-4D which provide example diagrams illustrating phases of computation under various conditions in accordance with one illustrative embodiment. FIG. 4A is an example diagram illustrating the computational phases for processing an example workload in accordance with one illustrative embodiment. The phases 410-440 shown in FIG. 4A represent the phases of computation that would be followed by one large set of compute engines without implementation of the approximation run-ahead mechanisms of the illustrative embodiments. Thus, as shown in FIG. 4A, the computations phases include a first phrase 410 followed by a second phrase 420 with these two phases being repeated, such as for a different portion of a large data set, as phases 430 and 440.

Figure 4B:
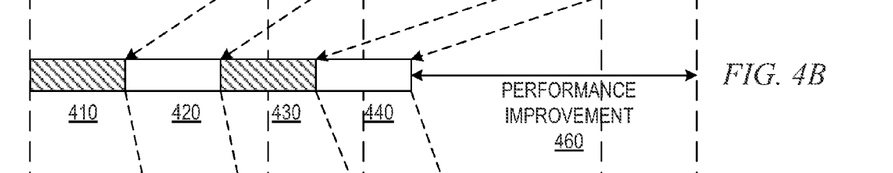

FIG. 4B illustrates the same set of computation phases but with the implementation of the approximation run-ahead mechanisms of the illustrative embodiments. As shown in FIG. 4B, the first and third phases, rather than being performed using full analytical computations on a full set of data, are executed using approximate run-ahead computations, such as by a second group (J) 340 of compute engines. The approximation is performed with sufficient confidence and accuracy by a relatively smaller group of compute engines (J) 340. As a result, there is a performance improvement illustrated by arrow 450 with only the introduction of an acceptable amount of error as specified by one or more pre-determined thresholds.

Figure 4C:
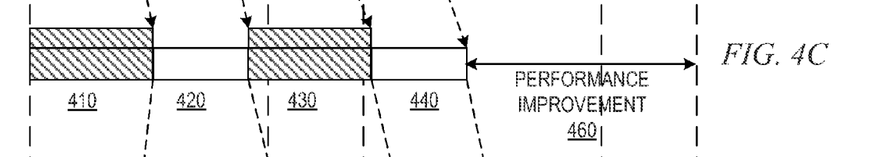

FIG. 4C is an example diagram of phases of computation in the event that a difference between the first group (I) and the second group (J) of compute engines is equal to or greater than an acceptable amount, such as may be defined by one or more pre-determined threshold values. As shown in FIG. 4C, in such a case, the analytics coordinator engine may restart the first phase computation with more input data possibly using additional compute engines (J) (represented by 460) in order to reduce the difference to within the acceptable range specified by the one or more pre-determined threshold values. The increase in the amount of data to be processed may extend the time for completing the computations as is illustrated by the relatively larger size phase representations in FIG. 4C.

Figure 4D:
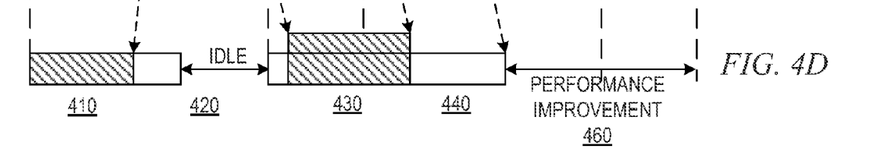

FIG. 4D is an example diagram of phases of computation in the event that a partial re-computation is necessary due to a confidence measure for the approximated results being less than a desired confidence measure. In the depicted example, in phase 410 the approximated computation results are determined to have some wrong results that reduce the confidence measure for the approximation and the analytics coordinator engine determines that a partial re-computation of the approximate results in phase 420 is necessary. As a result, the analytics coordinator engine waits for the first group (I) of compute engines to finish their processing of their current workload, as represented by the "idle" portion of the figure. Then, the partial computation of phase 420 is performed. During the third phase 430, the second group (J) of compute engines are reconfigured to meet the required accuracy and confidence measure, such as in the case described above with regard to FIG. 4C. That is, (J) will partially recompute in phase 2 (420) since some of its input from phase 1 (410) was incorrect. Once partial recomputation in phase 2 is complete, phase 3 (430) starts with reconfiguration as illustrated in FIG. 4C. Note that the length of phase 430 in FIG. 4D is the same as the phase in FIG. 4C. While in each scenario shown in FIGS. 4B-4D the performance of the mechanisms of the illustrative embodiments is reduced when recomputation is required, the performance in each case is still improved when compared to the performance of the mechanism as shown in FIG. 4A that does not implement the illustrative embodiments.

Figure 5:
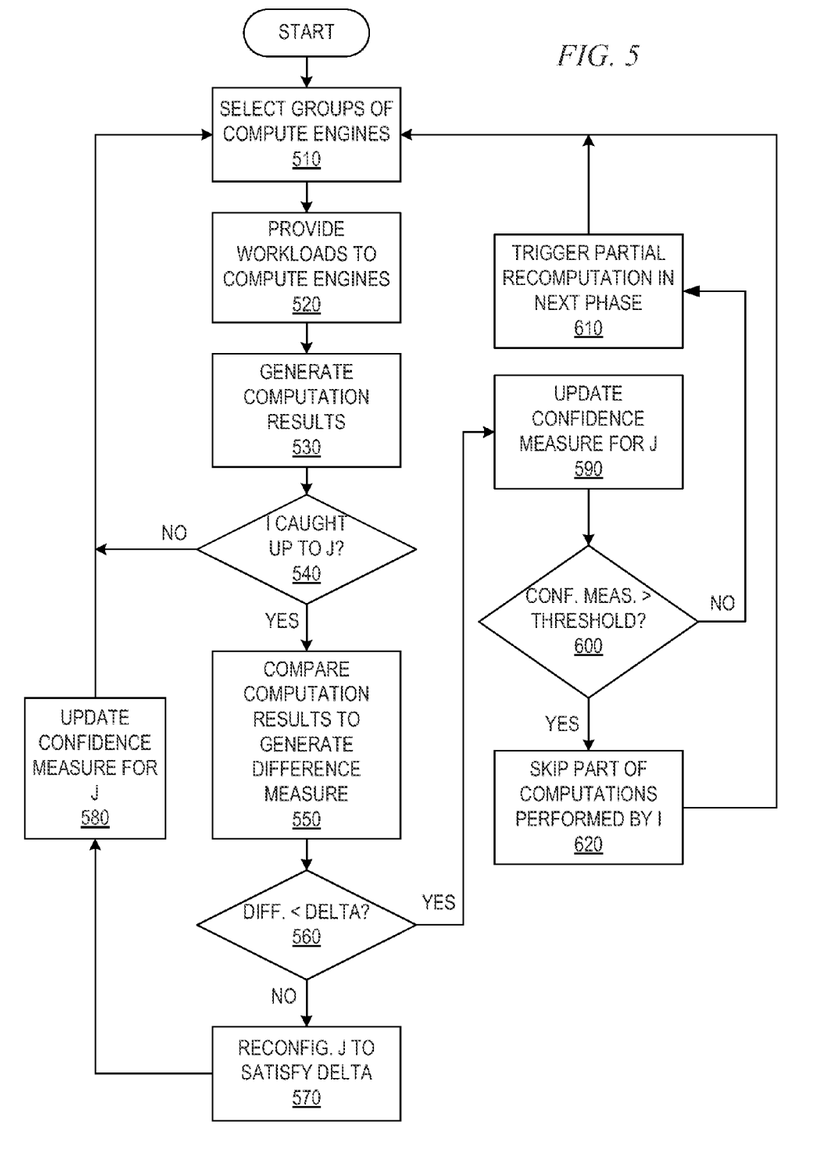
FIG. 5 is an example flowchart outlining an operation of an analytics coordinator engine in accordance with one illustrative embodiment.

FIG. 5 is an example flowchart outlining an operation of an analytics coordinator engine in accordance with one illustrative embodiment. As shown in FIG. 5, the operation starts with selecting a groups of compute engines for performing full analytic computations, approximate run-ahead analytic computations, and difference determination computations (step 510). Workloads are provided to the groups of compute engines (step 520) with the full analytic computation group(s) of compute engines performing full analytic computations on one or more portions of an input data set, the approximate run-ahead analytic compute engines performing analytic computations on a sampled subset of one or more portions of the input data set, and the difference determination compute engines generating difference measures between the results generated by the other groups of compute engines (step 530).

Assuming that the fully analytic computation group(s) are identified as group (I), the approximate run-ahead analytic compute engines are identified as group (J), and the difference determination compute engines are identified as group (K), a determination is made as to whether (I) has caught up with (J), i.e. (I) has finished a compute phase that was done earlier by (J), e.g., (I) has caught up with (J) on compute phase 1 while (J) has already progressed to compute phase 3 (step 540). Put another way, (I) has completed an iteration of a loop that is within a range of iterations already handled by (J). If not, the operation returns to step 540 and continues to monitor for a condition where (I) catches up with (J) at a certain compute phase. If (I) has caught up with (J) at that compute phase, then a comparison of the results of (I) and (J) is made to generate one or more difference values (step 550).

The analytics coordination engine determines if the difference is less than one or more predetermined threshold values (in this case threshold value delta) (step 560). If not, then the analytics coordination engine reconfigures (J) to satisfy the one or more predetermined threshold values (step 570). For example, the reconfiguration may involve adding additional compute engines to (J) and/or increasing the amount of data from the input data set upon which the approximate run-ahead computations are performed. In addition, a confidence measure associated with the approximate run-ahead computation results is updated (step 580). The operation then returns to step 540) so that recomputation of the approximate run-ahead computations may be performed.

In response to the difference being less than the one or more threshold values or not, a confidence measure associated with the approximate run-ahead computation results is updated (step 590) and a determination is made as to whether this confidence measure is less than a predetermined threshold (step 600). Moreover, if a parallel operation, if the results of the current phase of computation are to be used in a later phase of computation, if the difference is less than the one or more threshold values, then the results of the current phase of computation may be forwarded for use by the algorithm for later phases of computation (step 610).

If the confidence measure is less than the predetermined threshold value (step 600), then nothing further is done and the operation returns to step 540. If there is enough confidence in the approximate computations, i.e. the confidence measure is equal to or greater than the predetermined threshold (step 600), then the analytics coordination engine instructs the full analytic computation group(s) to skip at least a portion of their computations being performed (step 620). The operation as outlined above may continue until an exit condition occurs that causes the operation to terminate, such as all of the input data set having been processed, an unrecoverable error in the execution of the algorithm, or the like.

Thus, the illustrative embodiments provide mechanisms for efficient run-ahead approximate computations using groups of compute engines and coordination between these groups of compute engines. The illustrative embodiments greatly increase the overall performance of analytic computations by leveraging the speed of approximate computations while measuring the accuracy and confidence of the approximate computations against fully analytic computations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
   select a first group of compute engines, from a pool of compute engines, to execute full computations on a full set of input data;
   select a second group of compute engines, from the pool of compute engines, to execute computations on a sampled subset of the input data;
   select a third group of compute engines, from the pool of compute engines, to compute a difference in computation results between first computation results generated by the first group of compute engines and second computation results generated by the second group of compute engines; and
   reconfigure the second group of compute engines based on the difference generated by the third group of compute engines at least by modifying a number of compute engines selected to be part of the second group of compute engines, wherein the second group of compute engines comprises a number of compute engines that is smaller in number than a number of compute engines in the first group of compute engines.

2. The computer program product of claim 1, wherein the pool of compute engines comprise at least one of a pool of processors, a pool of functional units within one or more processors, a pool of data processing devices, each data processing device comprising one or more processors, or a pool of special purpose accelerators that accelerate a particular type of computation.

3. The computer program product of claim 1, wherein the second group of compute engines execute approximate computations on the sampled subset of the input data.

4. The computer program product of claim 3, wherein the computer readable program causes the computing device to reconfigure the second group of compute engines based on the difference generated by the third group of compute engines by reconfiguring the second group of compute engines based on a degree of accuracy of the approximate computations and a measure of confidence in these approximate computations.

5. The computer program product of claim 1, wherein the computer readable program causes the computing device to select a first group of compute engines, from a pool of compute engines, to execute full computations on a full set of input data by selecting a group of compute engines from the pool of compute engines based on at least one of an arbitrary selection method, a selection of compute engines based on performance capabilities of the compute engines, current workloads of the compute engines, or physical affinity of the compute engines.

6. The computer program product of claim 1, wherein the second group of compute engines execute the computations in a runahead manner such that the data upon which the second group of compute engines operates comprises data that is relatively later in sequence in the set of input data than data upon which the first group of compute engines operates.

7. The computer program product of claim 1, wherein the computer readable program causes the computing device to reconfigure the second group of compute engines by increasing a number of compute engines in the second group of compute engines.

8. The computer program product of claim 1, wherein the computer readable program causes the computing device to reconfigure the second group of compute engines further by increasing a size of the sampled subset of data from the set of input data upon which the second group of compute engines operates.

9. The computer program product of claim 1, wherein the computer readable program causes the computing device to reconfigure the second group of compute engines in response to the difference in computation results not being within a predetermined tolerance specified by one or more threshold values.

10. The computer program product of claim 9, wherein in response to the difference in computation results not being within the predetermined tolerance, the computer readable program further causes the computing device to initiate a partial re-computation by the reconfigured second group of compute engines in a next phase of computation.

11. The computer program product of claim 1, wherein, in response to the difference in computation results being within a predetermined tolerance as specified by one or more threshold values, the computer readable program further causes the computing device to:
   generate an interrupt to interrupt the computations being performed by the first group of compute engines; and
   utilize results of the computations of the second group of compute engines as results of a computation phase of code being executed by the first and second groups of compute engines.

12. The computer program product of claim 1, wherein the full computations on the full set of input data and computations on a sampled subset of the input data, are computations of a first phase of computations of an algorithm, and wherein the computer program product further causes the computing device to:
   forward, in response to the difference corresponding to a predefined condition, results generated by the second group of compute engines to a second phase of computations of the algorithm while the full computations of the first group of compute engines during the first phase of computations are still on-going.

13. A data processing system, comprising:
   a coordinator engine; and
   a pool of compute engines coupled to the coordinator engine, wherein the coordinator engine:
   selects a first group of compute engines, from the pool of compute engines, to execute full computations on a full set of input data;
   selects a second group of compute engines, from the pool of compute engines, to execute computations on a sampled subset of the input data;
   selects a third group of compute engines, from the pool of compute engines, to compute a difference in computation results between first computation results generated by the first group of compute engines and second computation results generated by the second group of compute engines; and
   reconfigures the second group of compute engines based on the difference generated by the third group of compute engines at least by modifying a number of compute engines selected to be part of the second group of compute engines, wherein the second group of compute engines comprises a number of compute engines that is smaller in number than a number of compute engines in the first group of compute engines.

* * * * *